No. 830,913. PATENTED SEPT. 11, 1906.
E. MUNDSCHENK.
BELT FASTENER.
APPLICATION FILED FEB. 12, 1906.
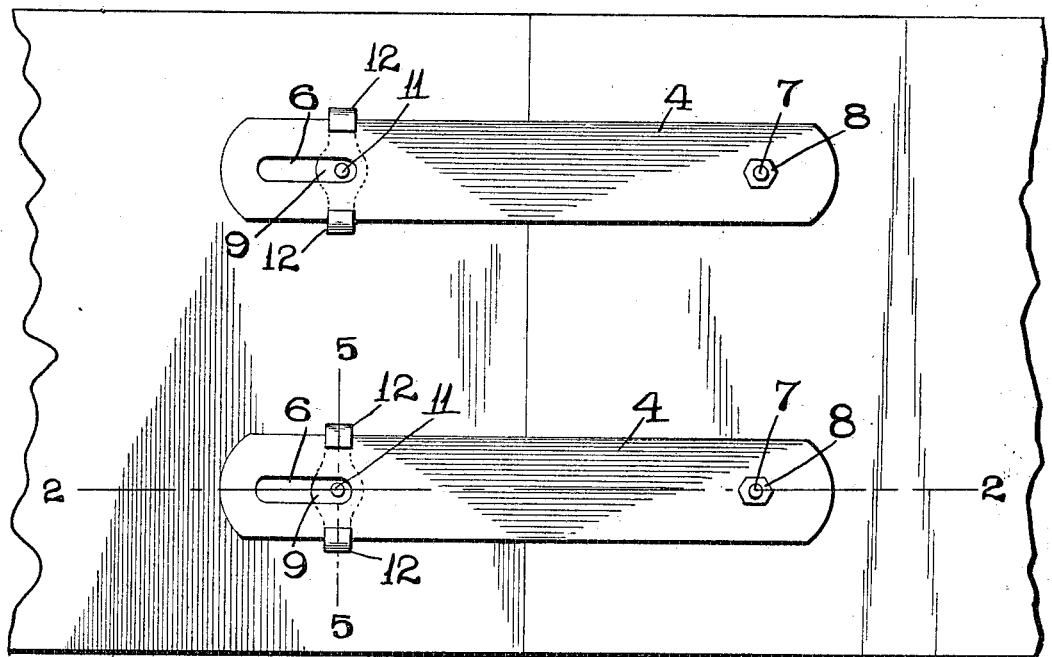
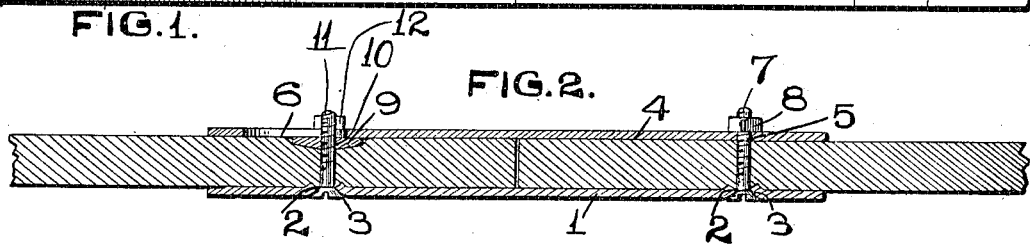
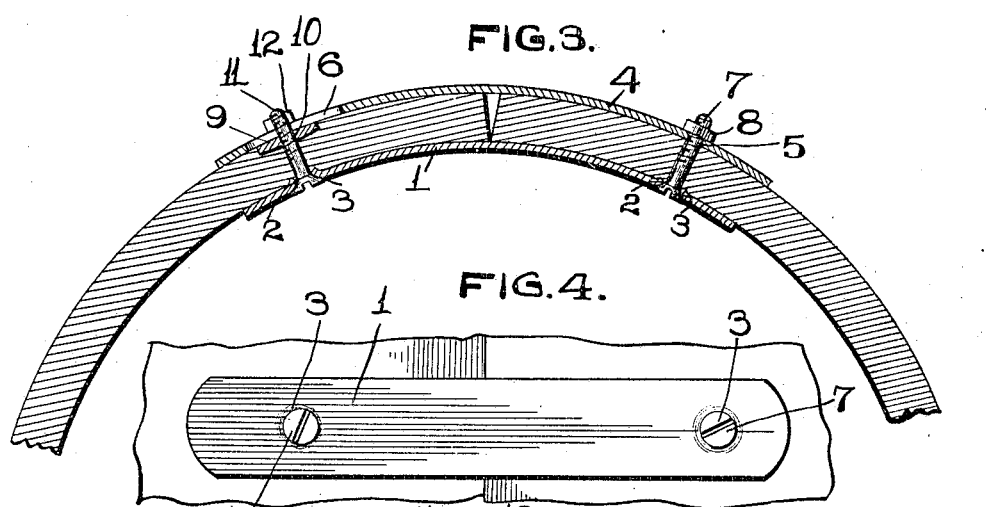
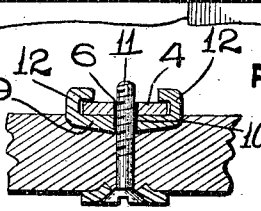
INVENTOR
EDWARD MUNDSCHENK.

UNITED STATES PATENT OFFICE.

EDWARD MUNDSCHENK, OF ST. LOUIS, MISSOURI.

BELT-FASTENER.

No. 830,913.　　　Specification of Letters Patent.　　　Patented Sept. 11, 1906.

Application filed February 12, 1906. Serial No. 300,780.

*To all whom it may concern:*

Be it known that I, EDWARD MUNDSCHENK, a citizen of the United States, and a resident of St. Louis, Missouri, have invented certain new and useful Improvements in Belt-Fasteners, of which the following is a specification containing a full, clear, and exact description, reference being had to the accompanying drawings, forming a part hereof.

My invention relates to a belt-fastener; and the object of my invention is to construct a simple inexpensive belt-fastener which may be quickly and easily placed in position to secure the ends of a belt together and which when in position will conform to the curvature of the pulleys around which the belt passes without tearing the belt or becoming loosened thereon.

To the above purposes my invention consists of certain novel features of construction and arrangement of parts, which will be hereinafter more fully set forth, pointed out in my claims, and illustrated in the accompanying drawings, in which—

Figure 1 is a plan view of the meeting ends of the belt united by my improved fastener. Fig. 2 is a longitudinal section taken on the line 2 2 of Fig. 1. Fig. 3 is a view analogous to Fig. 2 and showing the belt curved in the position it assumes in passing around a pulley. Fig. 4 is a plan view of one of the plates that is positioned on the under side of the ends of a belt. Fig. 5 is a transverse section, enlarged, taken on the line 5 5 of Fig. 1.

Referring by numerals to the accompanying drawings, 1 designates a thin metallic plate, which is preferably of steel in order that it will readily bend, and formed through each end of this plate is an aperture 2, and the material of the plate around each aperture is countersunk, as indicated by 3, by being pressed inwardly and these countersunk edges embed themselves in the belt to assist in rigidly fastening the plate when it is positioned for use. This plate is located on the under side of the meeting ends of the belt, and positioned on the top side of the belt immediately over said plate is a second thin metallic plate 4, preferably of steel, in one end of which is formed an aperture 5 and in the opposite end a slot 6. The inner end of this slot 6 coincides with one of the apertures 2 in the plate 1 when the belt and plates are perfectly horizontal.

Passing through one of the apertures 2, through one end of the belt, and through the aperture 5 is a screw-bolt 7, the head of which occupies the countersunk recess around the corresponding aperture 2, and seated upon the screw-threaded end of this screw-bolt 7 above the plate 4 is a nut 8.

Positioned beneath the end of the plate 4, which is provided with the slot 6, and embedded in the belt beneath said plate is a plate 9, in the center of which is formed a screw-threaded aperture 10, that is in direct vertical alinement with the corresponding one of the apertures 2. A screw-bolt 11 passes through this last-mentioned one of the apertures 2 and is screw-seated in the aperture 10, and the point of said screw extends through the slot 6 in the top plate 4. Formed integral with the ends of the plate 9 are upwardly-projecting fingers 12, which overlap the side edges of the top plate 4.

Where a belt is of considerable width a number of the fasteners are utilized to secure the ends thereof together, and when so secured the ends of the belt cannot readily pull apart, owing to the fact that the screw-bolts pass directly through the ends of the metal plates.

One end of the outer plate 4 of each fastener is held to slide freely beneath the fingers 12 of the plate 9, and therefore when the belt travels around a small pulley there will be no extra strain on the fastener, owing to the increased radius of the outer plate over the inner plate.

The plates are preferably formed of thin sheets of steel that will readily bend to conform to the curvature of the belt while in use, and said plates being securely held together and to the ends of the belt form a very simple, inexpensive, and easily-applied fastener.

I claim—

1. A belt-fastener, constructed with a pair of plates applied to the opposite sides of the meeting ends of a belt, one end of one of the plates being slotted, a plate arranged beneath the plate having the slot therein, fingers integral with the ends of the second-mentioned plate which engage the edges of the slotted plate, and screw-bolts passing through the ends of the pair of plates, one of which screw-bolts passes through the second-mentioned plate and through the slot in one of the pair of plates; substantially as specified.

2. A belt-fastener, constructed with a pair of plates applied to the opposite sides of the meeting ends of a belt, one end of one of the plates being slotted, a plate arranged beneath the plate having the slot therein, and screw-bolts passing through the ends of the pair of plates, one of which screw-bolts passes through the second-mentioned plate and through the slot in one of the pair of plates; substantially as specified.

In testimony whereof I have signed my name to this specification in presence of two subscribing witnesses.

EDWARD MUNDSCHENK.

Witnesses:
M. P. SMITH,
E. L. WALLACE.